United States Patent
Lempiö et al.

(10) Patent No.: US 7,551,930 B2
(45) Date of Patent: Jun. 23, 2009

(54) LOCATION-BASED SERVICES FOR MOBILE STATIONS USING SHORT RANGE WIRELESS TECHNOLOGY

(75) Inventors: Jarkko Lempiö, Nokia (FI); Tomi Heinonen, Tampere (FI)

(73) Assignee: Nokia Corporation, Espoo (FI)

( * ) Notice: Subject to any disclaimer, the term of this patent is extended or adjusted under 35 U.S.C. 154(b) by 563 days.

(21) Appl. No.: 10/140,399

(22) Filed: May 6, 2002

(65) Prior Publication Data

US 2003/0207683 A1   Nov. 6, 2003

(51) Int. Cl.
H04B 7/00 (2006.01)
H04B 1/38 (2006.01)
H04M 3/00 (2006.01)
H04Q 7/20 (2006.01)

(52) U.S. Cl. .................. 455/456.3; 455/41.2; 455/419; 455/432.3; 455/435.1; 455/456.4; 455/456.5; 455/457; 455/566

(58) Field of Classification Search ................ 455/41.2, 455/456.3, 419, 435.1, 456.4, 456.5, 566, 455/432.3, 457
See application file for complete search history.

(56) References Cited

U.S. PATENT DOCUMENTS

| 5,778,304 | A | | 7/1998 | Grube et al. | |
|---|---|---|---|---|---|
| 5,907,544 | A | * | 5/1999 | Rypinski | 370/337 |
| 6,070,083 | A | * | 5/2000 | Watters et al. | 455/517 |
| 6,219,696 | B1 | * | 4/2001 | Wynblatt et al. | 709/218 |
| 6,477,117 | B1 | * | 11/2002 | Narayanaswami et al. | 368/251 |
| 6,505,049 | B1 | * | 1/2003 | Dorenbosch | 455/456.2 |
| 6,608,556 | B2 | * | 8/2003 | De Moerloose et al. | 340/501 |
| 6,694,143 | B1 | * | 2/2004 | Beamish et al. | 455/456.1 |
| 6,697,018 | B2 | * | 2/2004 | Stewart | 342/386 |
| 6,701,144 | B2 | * | 3/2004 | Kirbas et al. | 455/417 |

(Continued)

FOREIGN PATENT DOCUMENTS

EP   0 891 110 A1   1/1999

(Continued)

OTHER PUBLICATIONS

Abstract of Finnish Patent Application No. FI 200 200 412 A, Derwent Publications Ltd., XP-002377332.

(Continued)

*Primary Examiner*—Fan Tsang
*Assistant Examiner*—Lisa Hashem
(74) *Attorney, Agent, or Firm*—Ditthavong Mori & Steiner, P.C.

(57) ABSTRACT

A system and method for location-dependent services for mobile stations using short range wireless technology such as Bluetooth. In an advantageous embodiment, the location-based service is a suggested profile change for a mobile station. A suggested profile may be a mode of operation for the mobile station's current location (e.g., silence in a meeting room) and may be accompanied by the period of time that the profile is valid and a timer value for a forced change to the suggested profile in the absence of user interaction. In response to a prompt from a mobile station that has received a suggested profile, a user may either accept or cancel the suggested profile. Various mechanisms are disclosed for ensuring that services such as a suggested profile change is sent to mobile stations having more than a passing association with the access point's coverage area.

35 Claims, 14 Drawing Sheets

U.S. PATENT DOCUMENTS

| | | | |
|---|---|---|---|
| 6,807,427 B1* | 10/2004 | Sakamoto et al. | 455/456.1 |
| 6,813,501 B2* | 11/2004 | Kinnunen et al. | 455/456.2 |
| 6,816,719 B1* | 11/2004 | Heinonen et al. | 455/403 |
| 6,819,908 B2* | 11/2004 | Spratt | 455/3.03 |
| 6,847,823 B2* | 1/2005 | Lehikoinen et al. | 455/456.1 |
| 6,879,838 B2* | 4/2005 | Rankin et al. | 455/456.6 |
| 6,888,811 B2* | 5/2005 | Eaton et al. | 455/456.2 |
| 6,898,445 B2* | 5/2005 | Slettengren et al. | 455/567 |
| 6,915,135 B1* | 7/2005 | McKee et al. | 455/456.6 |
| 6,925,288 B2* | 8/2005 | McDonnell et al. | 455/41.2 |
| 7,020,438 B2* | 3/2006 | Sinivaara et al. | 455/41.2 |
| 7,026,992 B1* | 4/2006 | Hunt et al. | 342/465 |
| 7,031,654 B2* | 4/2006 | Yamaguchi | 455/7 |
| 7,139,557 B2* | 11/2006 | Tang et al. | 455/414.2 |
| 7,221,939 B2* | 5/2007 | Ylitalo et al. | 455/435.1 |
| 7,231,441 B2* | 6/2007 | Smith et al. | 709/224 |
| 7,310,532 B2* | 12/2007 | Knauerhase et al. | 455/456.1 |
| 7,313,383 B2* | 12/2007 | Fujii | 455/410 |
| 7,370,085 B2* | 5/2008 | Brown et al. | 709/217 |
| 2001/0018349 A1* | 8/2001 | Kinnunen et al. | 455/456 |
| 2001/0036224 A1* | 11/2001 | Demello et al. | 375/220 |
| 2001/0049275 A1* | 12/2001 | Pierry et al. | 455/414 |
| 2002/0022453 A1* | 2/2002 | Balog et al. | 455/41 |
| 2002/0039882 A1 | 4/2002 | Ternullo et al. | |
| 2002/0082921 A1* | 6/2002 | Rankin | 705/14 |
| 2002/0107027 A1* | 8/2002 | O'Neil | 455/456 |
| 2002/0123307 A1* | 9/2002 | Winarski | 455/41 |
| 2002/0137493 A1* | 9/2002 | Dutta | 455/414 |
| 2002/0142792 A1 | 10/2002 | Martinez | |
| 2002/0178211 A1* | 11/2002 | Singhal et al. | 709/201 |
| 2003/0008662 A1* | 1/2003 | Stern et al. | 455/456 |
| 2003/0200140 A1* | 10/2003 | Hars | 705/14 |
| 2004/0002948 A1 | 1/2004 | Mantyjarvi et al. | |
| 2004/0100973 A1* | 5/2004 | Prasad | 370/401 |
| 2005/0227677 A1* | 10/2005 | Kallio | 455/414.3 |
| 2006/0183467 A1* | 8/2006 | Stewart | 455/414.3 |
| 2006/0234758 A1 | 10/2006 | Parupudi et al. | |

FOREIGN PATENT DOCUMENTS

| | | |
|---|---|---|
| EP | 1 041 849 A1 | 10/2000 |
| FI | 112999 B | 2/2004 |
| WO | WO 97/49255 | 12/1997 |
| WO | WO 00/32002 | 6/2000 |
| WO | WO 00/69202 | 11/2000 |
| WO | WO 00/74424 A1 | 12/2000 |
| WO | WO 01/67799 A2 | 9/2001 |
| WO | WO 0167799 A2 * | 9/2001 |

OTHER PUBLICATIONS

"Specification of the Bluetooth System—Wireless Connections Made Easy—Profiles", Feb. 22, 2001, Version 1.1, XP-002313541, pp. 13-62.

Specification of the Bluetooth System, Feb. 22, 2001, Version 1.1, XP002262603, pp. 1-392.

Communication from the European Patent Office dated Dec. 29, 2003 enclosing European Search Report for EP Application No. 03252526.3-1249.

Abstract of Finnish Patent Application No. FI 200 200 412 A, Derwent Publications Ltd., XP-002377332, This Reference is Dated Mar. 4, 2002.

* cited by examiner

505 — SUGGESTED PROFILE [MEETING/SILENCE, FLIGHT/SWITCH OFF, ETC.]
510 — SUGGESTED DURATION [1-24000] SECONDS
515 — FORCE CHANGE TO SUGGESTED PROFILE AFTER: [0-3600 SECONDS]

FIG. 5A

| ID OF MOBILE IN COVERAGE AREA | LENGTH OF TIME IN COVERAGE AREA | PROFILE/DURATION AND TIMER VALUE FOR FORCED CHANGE SENT? |
|---|---|---|
| 1234 | 600 SECONDS | Y |
| 5678 | 10 SECONDS | N |
| ⋮ | ⋮ | ⋮ |
| 9012 | 180 SECONDS | Y |

FIG. 5B

| SERVICE | MOBILE$_1$ ID | MOBILE$_2$ ID | ... | MOBILE$_N$ ID |
|---|---|---|---|---|
| SILENT MODE | 1234 | 5678 | ... | 9012 |
| ACCESS TO FIRST CLASS LOUNGE | 5678 | | ... | |

FIG. 5C

LOCATION-BASED SERVICES FOR MOBILE STATIONS USING SHORT RANGE WIRELESS TECHNOLOGY

FIELD OF THE INVENTION

This invention relates generally to wireless communications systems, and more particularly, to location-dependent wireless services for mobile terminals using short range wireless technology.

BACKGROUND OF THE INVENTION

Mobile stations, such as mobile telephones, have become ubiquitous. For various reasons, however, it is undesirable to use mobile stations in certain locations. For example, for safety reasons, mobile stations should be switched off when there is a likelihood that the radio signals could interfere with equipment. The strength of the signals transmitted by a mobile station are relatively strong in the immediate vicinity of the mobile station and are typically much stronger than the signals from the base station which are received by the mobile station. For this reason, mobile stations should be switched off in airplanes, hospitals and the like. In other situations, it is desirable for mobile stations to be switched off for social reasons such as when a user is in a theatre, a business meeting and the like.

Mechanisms have been developed for a network device to automatically switch off a mobile station when the mobile station enters a location. Nevertheless, mechanisms are still needed for increasing the likelihood that these, and other, location-based services are provided to mobile stations that have more than just a fleeting association with the coverage area of the network device. This is particularly important given that such network devices are limited in the number of active connections that they can establish with mobile stations.

SUMMARY OF THE INVENTION

The above-identified problems are solved and a technical advance is achieved in the art by providing a system and method for providing a service to a mobile station.

An exemplary method includes: determining a length of time that a mobile station has been in an access point coverage area; and if the mobile station has been in the coverage area for a predefined period of time, providing a data relating to a service to the mobile station.

In an alternate embodiment, an exemplary method includes: monitoring a length of time that each of a plurality of mobile stations has been in an access point coverage area; providing data relating to a service to one of the plurality of mobile stations that has been in the coverage area for a predefined period of time; and providing data relating to a service to each additional one of the plurality of mobile stations as each additional one of the plurality of mobile station's length of time within the coverage area reaches the predefined period of time.

In yet another embodiment, an exemplary method includes: monitoring a length of time that each of a plurality of mobile stations has been in an access point coverage area; identifying mobile stations that have been in the coverage area for a predefined period of time; providing data relating to a service to the identified mobile stations based on the length of time that each mobile station has been in the coverage area, wherein mobile stations that have been in the coverage area longer receive the data relating to the service first.

In an alternate embodiment, an exemplary method includes: transmitting at a first power level in identifying a client; and transmitting at a second power level in providing data relating to a service to the client, wherein the first power level is less than the second power level.

In yet an alternate embodiment, an exemplary method includes using a first antenna for transmission in identifying a client; and using a second antenna for transmission in providing data relating to a service to the client, wherein the first antenna has a smaller coverage area than the second antenna.

Other and further aspects of the present invention will become apparent during the course of the following description and by reference to the attached drawings.

BRIEF DESCRIPTION OF THE DRAWINGS

FIG. 5A are exemplary parameters for transmission between an access point and a mobile station in accordance with one embodiment of the present invention.

FIG. 5B depicts an exemplary database in an access point of one embodiment of the present invention.

FIG. 5C depicts another exemplary database in an access point of one embodiment of the present invention.

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
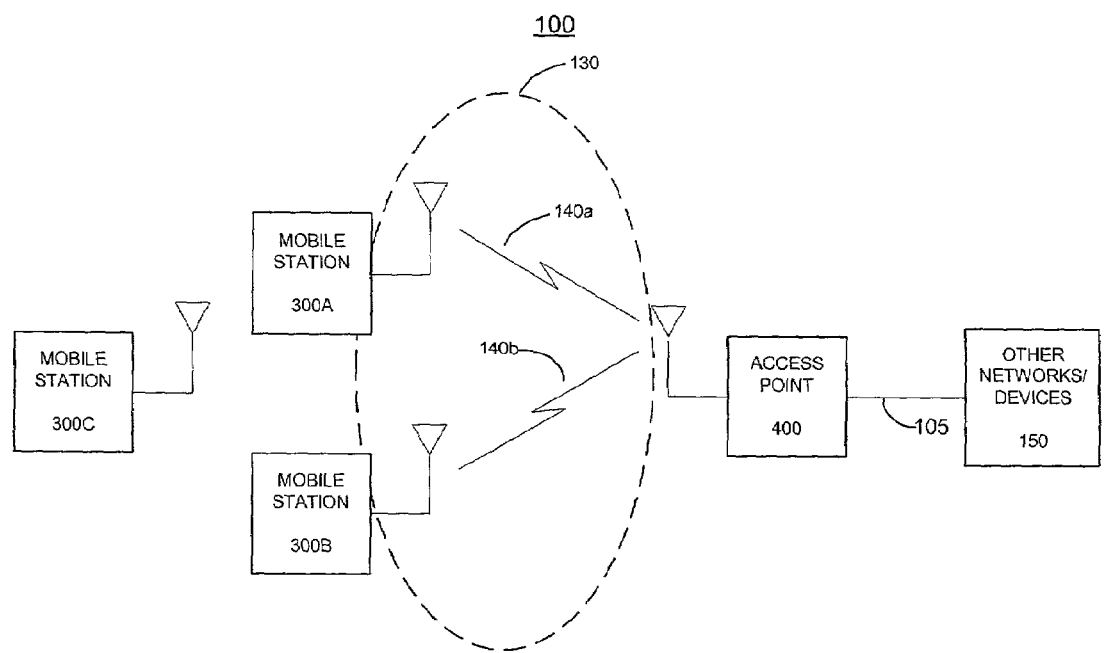
FIG. 1 is a block diagram illustrating an exemplary network diagram including an access point and mobile stations for use in accordance with the present invention.

Referring now to the drawings, wherein like reference numerals refer to like parts, FIG. 1 is a block diagram illustrating an exemplary network diagram including an access point and mobile stations for use in accordance with the present invention. As shown in FIG. 1, network 100 includes an access point 400, which communicates with mobile stations within its coverage area 130 using a short range wireless technology such as Bluetooth (operable at 2.4 GHz). For example, access point 400 communicates with mobile stations 300A and 300B over radio links 140a and 140b, respectively. Since mobile station 300C is not in the coverage area 130, however, it is not in communication with access point 400. Communication is established between access point 400 and mobile stations 300 within its coverage area preferably for purposes of providing those mobile stations 300 with a service, which, in one embodiment of the present invention is a suggested profile for the mobile station, as will be discussed in detail hereinafter in connection with, e.g., FIGS. 5A and 5B.

To assist in the provisioning of a service, access point 400 may also be coupled to other networks or devices 150, such as a server (not shown), via a wired LAN 105 using a data transmission protocol such as TCP/IP. Alternatively, it will be understood that the LAN 105 may be wireless, in which case, LAN 105 would be a wireless LAN (WLAN). Examples of WLAN technologies include the IEEE 802.11 wireless LAN standard (operable at 2.4 GHz and 5 GHz) and the HIPERLAN standard (operable in the 5 GHz, U-NII band). Alternatively, access point 400 may be coupled to the other networks or devices 150 using a short-range wireless technology such as the above-mentioned Bluetooth protocol.

Figure 2:
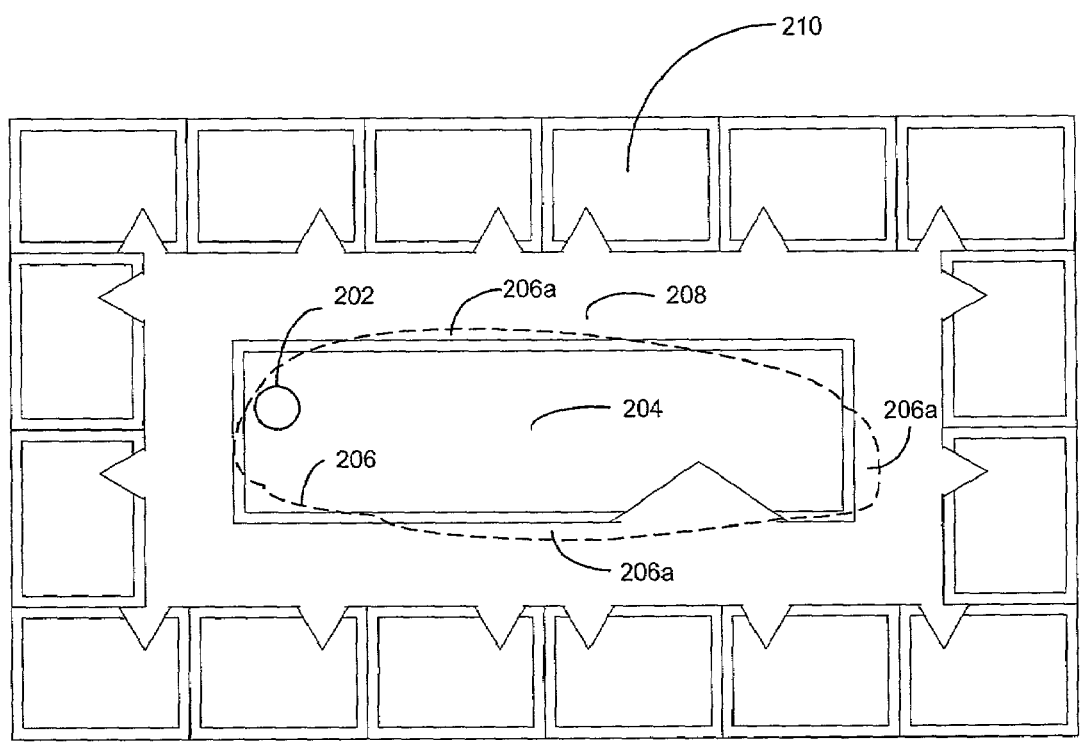
FIG. 2. is a block diagram illustrating an exemplary radio frequency (RF) access point coverage area in an office space.

FIG. 2. is a block diagram illustrating an exemplary radio frequency (RF) access point coverage area in an office space. It is to be understood, however, that the present invention may be used in any environment, including but not limited to a home environment, a retail environment, etc. The access point 202 in FIG. 2 is used to cover an interior conference room 204. It will be appreciated, however, that the present invention is not limited to use in an office-type environment. The coverage area of access point 202, as illustrated by reference numeral 206, is tailored as best as possible to reach the interior conference room 204 but not into the hallways 208 or exterior office space 210. Some of the coverage area, however, may spill over into the hallway 208, as indicated by the areas identified by reference numeral 206a. Mobile stations that pass through the areas identified by reference numeral 206 may receive the same service messages as mobile stations within the conference room 204. This may be undesirable, however, if the messages are intended only for those in conference room 204. As will be discussed in detail hereinafter, the present invention includes various mechanisms for ensuring that a service, such as a suggested profile, is sent to mobile stations having more than a passing association with the access point's coverage area. Although an infrared access point, rather than an RF access point may be employed, which eliminates the inaccuracies associated with the boundaries of an access point's coverage area, this introduces line-of-sight issues, as is well-known in the art.

Figure 3:
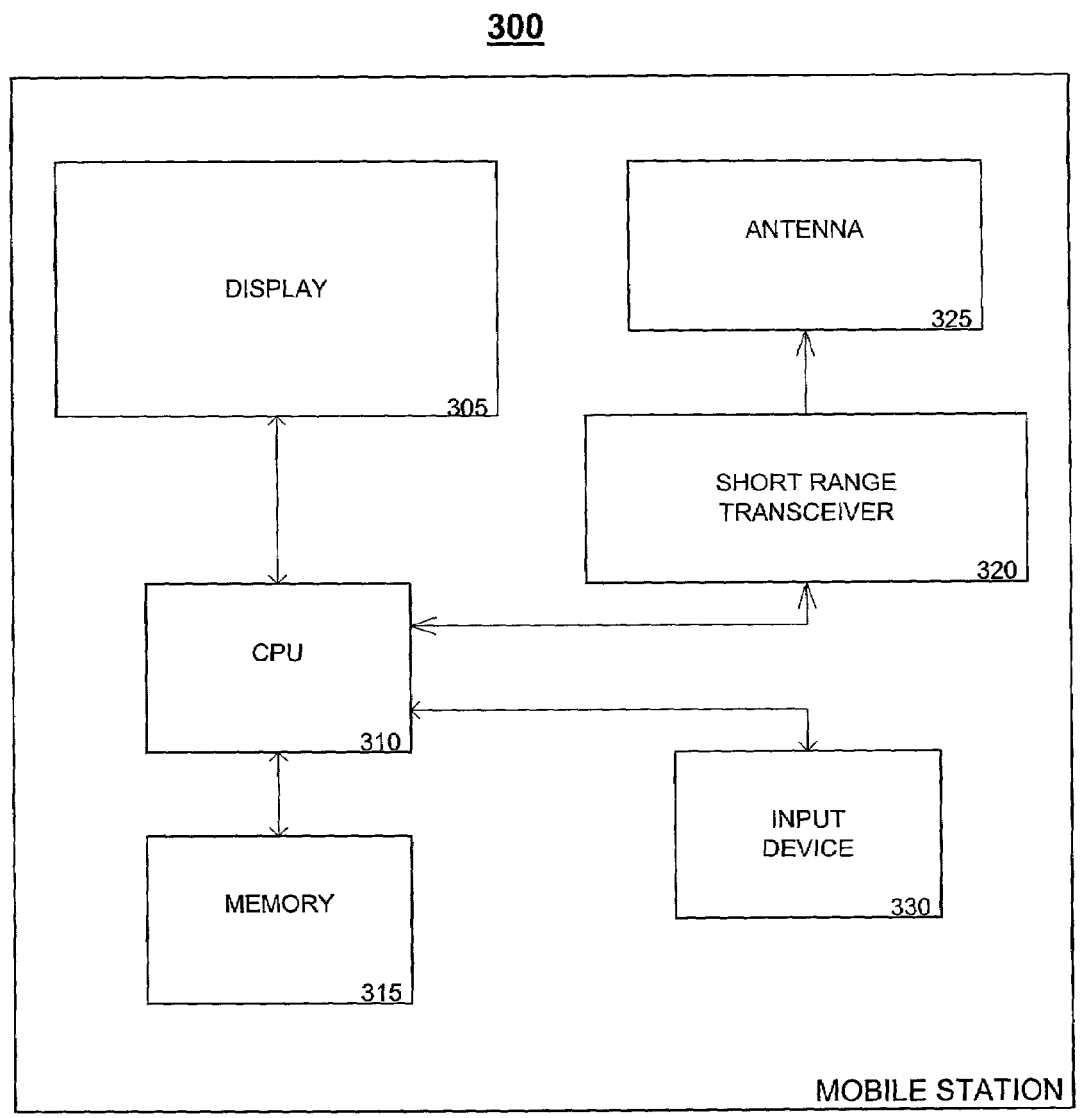
FIG. 3 is a block diagram illustrating an exemplary mobile station.

FIG. 3 is a block diagram illustrating an exemplary mobile station, which may be a laptop computer, personal data assistant (PDA), mobile telephone or the like. As shown in FIG. 3, user terminal 300 includes a display 305, preferably one with a touch screen capability, as is well-known in the art, and a CPU 310 and associated memory 315 for storing application software to enable communication with an access point 400 and implement a suggested profile change as will be discussed in detail hereinafter in connection with FIG. 6.

As further shown in FIG. 3, mobile station 300 also includes one or more short range wireless transceivers 320 and antenna 325 for communicating with an access point 400. In addition, user station 300 includes an input device 330, including but not limited to a keypad, which typically includes numerous function keys such as alpha-numeric keys and directional (arrow) keys for scrolling through and selecting from among content contained in memory 315 and/or displayed on display 305. Alternatively, a pointing device (not shown) may be used for manipulating stored and/or displayed content. Moreover, mobile station 300 may include personal information management features (PIM) such as an address book, calendar, notepad, etc.

Figure 4:
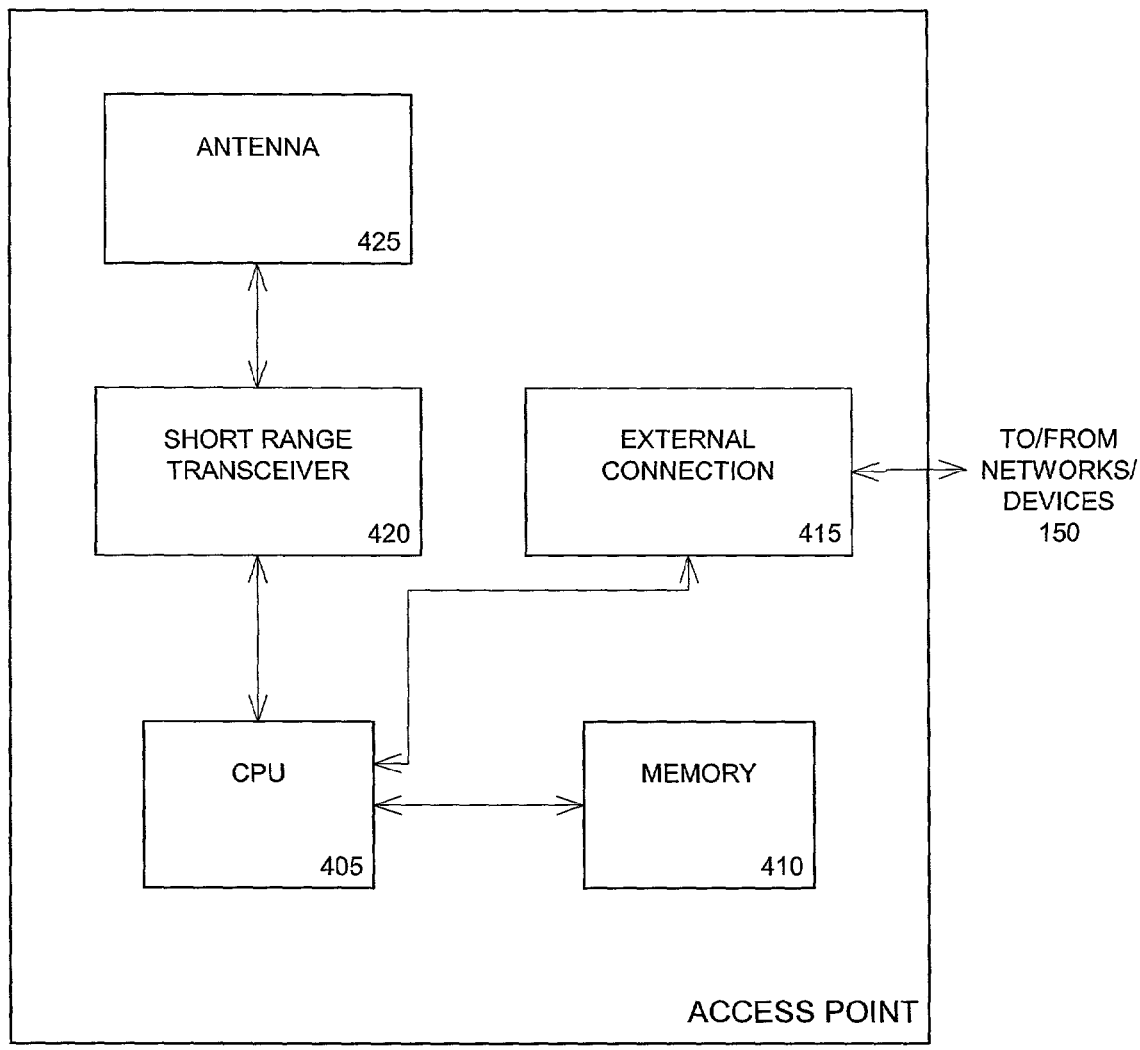
FIG. 4 is a block diagram illustrating an exemplary access point.

FIG. 4 is a block diagram illustrating an exemplary access point 400. An access point is a small "wireless plug", which may be mounted on a wall much like a cabled data access point as is well-known in the art. Access point 400 includes a CPU 405 together with associated memory 410 for storing application software, databases and data to be transmitted to mobile station 300, such as data relating to a suggested profile, as will be discussed in detail hereinafter in connection with FIGS. 5A, 5B and 5C. As will be discussed in detail in connection with FIG. 6, access point 400 may also have an operator-assigned "area name" stored in memory 410, which may be formed, e.g., from an associated company name and a place name, and which may be transmitted to the mobile station 300 for display along with a suggested profile.

Access point 400 communicates with mobile stations 300 via short range wireless RF transceivers 420, such as WLAN or Bluetooth, and antenna 425. If Bluetooth technology is employed, the operating range of the access point 400, and thus, the distance between an access point 400 and a mobile station 300, using current technology is in the range of up to 10 meters for a low power mode and 100 meters for a high power mode. Access point 400 also may be connected to external networks or devices 150 located on the wiring infrastructure of a LAN (not shown) via external connection 415.

FIG. 5A are exemplary parameters for transmission between an access point and a mobile station. In one embodiment of the present invention, an access point 400 may transmit a suggested user profile 505 to a mobile station 300 that has entered its coverage area. The suggested profile may include a suggested mode of operation for the mobile station 300. For example, if the access point 400 is located in a conference room where a meeting is underway, as in the case of FIG. 2, the suggested profile may be a "silent" mode. In a silent mode, the mobile station would not audibly announce an incoming call but would otherwise remain operable. Alternatively, if the access point 400 is located within an airplane cabin, the suggested mode may be a "switch off" mode, which would render the mobile station 200 inoperable upon departure from the gate.

As shown in FIG. 5A, access point 400 also may transmit a suggested duration 510 for the suggested profile. In other words, the access point 400 preferably provides the mobile station 400 with an indication (e.g., in seconds) of how long the suggested profile will remain in effect. This provides the user with additional information for use in deciding whether to accept or reject the suggested profile. In one embodiment, access point 400 also provides the mobile station 300 with a timer value for a forced change to a suggested profile 515 after a predetermined period of time (e.g., in seconds) has elapsed without any user interaction in response to the suggested profile/duration.

The suggested profile, duration and timer value for a forced change parameters are programmed into the access point 400 by the system operator based on an event that is to occur within the coverage area of the access point 400.

FIG. 5B depicts an exemplary database in an access point 400 of one embodiment of the present invention. As shown in FIG. 5B, an access point 400 preferably maintains a database concerning mobile stations 300 that have entered its coverage area. Alternatively, the database of FIG. 5B may be located in a network or device 150 accessible by access point 400 via, e.g., a LAN. In either case, for each mobile station 300, a record is maintained in the database indicating the identifier 550 of the mobile station within the access point's coverage area, which may be, e.g., the mobile station's Bluetooth address, the length of time 550 that the mobile station 300 has been in the coverage area and an indicator 560 of whether the suggested profile, suggested duration and a timer value for a forced change (if any) has been sent to the mobile station 300. As will be discussed in detail hereinafter, services, such as a suggested profile change, are made available to mobile stations that have remained in an access point's coverage area for a predefined period of time.

In one embodiment, an access point 400 makes services such as a suggested profile change available to only some of the mobile stations that have remained in its coverage area for a predefined period of time. In particular, some condition other than a mobile station's remaining in the access point's coverage area for the predefined period of time must be met in order for the mobile station to be "eligible" to receive the service. The access point 400 may determine a mobile station's "eligibility" to receive a service by accessing a database such as that shown in FIG. 5C, wherein for each service 570, the database includes a list 580 of eligible mobile stations. For example, for a service offered by an airline in an airport, the list may be that of all mobile stations that have registered as being associated with passengers who will be flying first class with the airline. Thus, eligibility may be tied to a characteristic of the user of the mobile station, in this case, e.g., whether or not the user has purchased or holds a first class ticket. Such users may then receive services such as a special offering in a tax free shop or access to a first class lounge area 590 in the airport. It is to be understood that like the database of FIG. 5B, the database of FIG. 5C may be located in either the access point 400 or the network or device 150.

The eligibility lists depicted in FIG. 5C may be generated by a user manually registering the mobile station (e.g., in person, electronically, via postal mail, etc.) or by a mobile station automatically registering itself upon entering the coverage area (e.g., by responding to an inquiry or page transmitted by the access point). In one embodiment, registration includes the mobile station transmitting a Class of Device (CoD) code to the access point. In this embodiment, service eligibility may then be limited to devices having a certain CoD code. For example, for the service "silent mode" 585 shown in FIG. 5C, only mobile stations having a CoD code "mobile phone" (and thus, a readily apparent ringtone capability sought to be suppressed) would be eligible to receive the service, whereas mobile stations with a CoD code of "laptop computer" would not be eligible, and thus, would not be added to the list.

Figure 6:
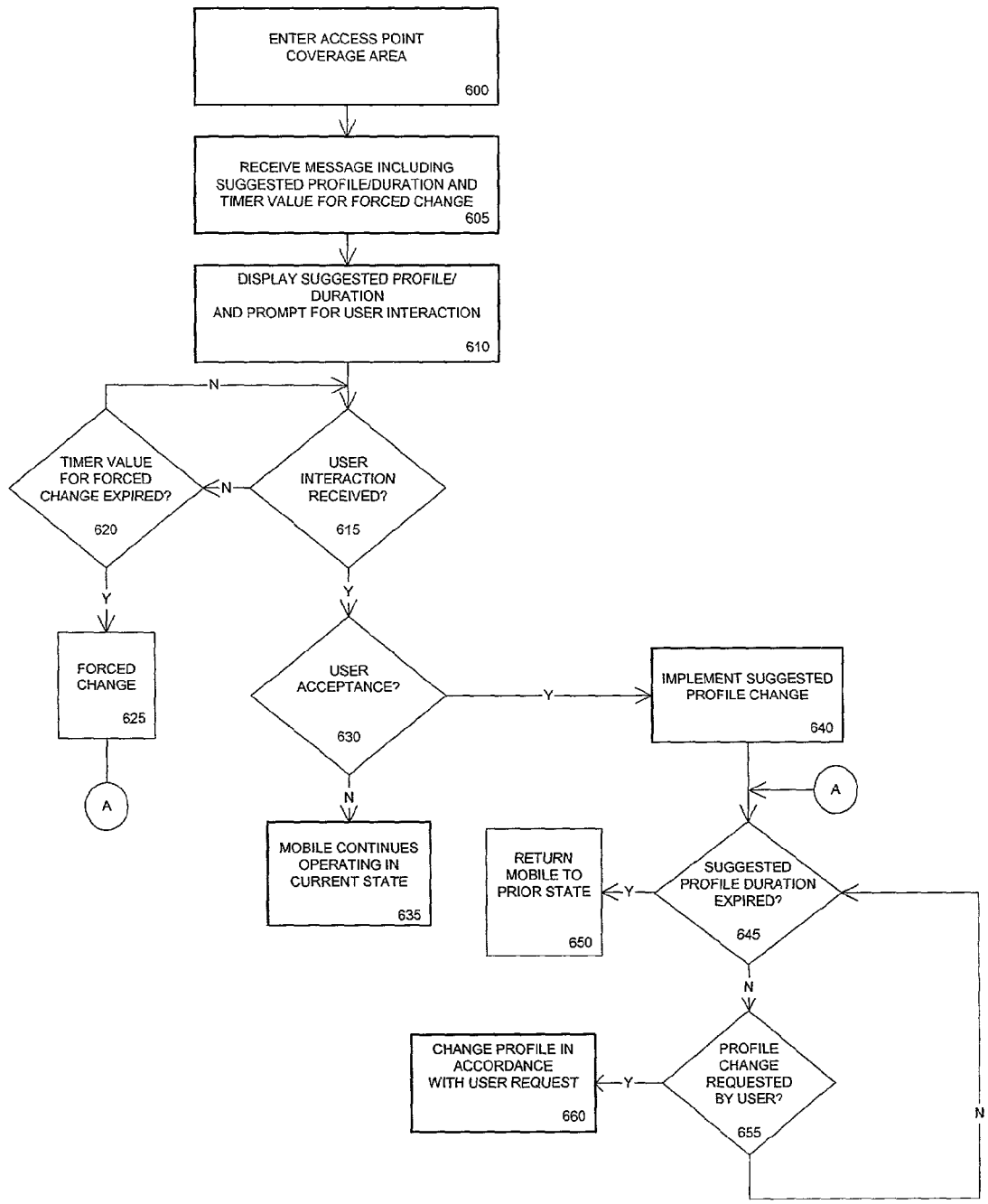
FIG. 6 is a flowchart illustrating an exemplary process by which a mobile station responds to a suggested profile change in accordance with one embodiment of the present invention.

FIG. 6 is a flowchart illustrating an exemplary process by which a mobile station responds to a suggested profile change in accordance with one embodiment of the present invention.

In step 600, a mobile station 300 enters an access point's 400 coverage area. In step 605, the mobile station 300 receives a message from the access point 400 including a suggested profile/duration and a timer value for a forced change. The access point name, which may comprise a company name and a place name, is also preferably transmitted to the mobile station at this time. In step 610, mobile station 300 displays the suggested profile together with the associated access point name, profile duration and timer value for a forced change on display 305 and prompts the user for interaction to either accept or reject the suggested profile (i.e., "OK" or "Cancel", respectively). A typical display may be as follows:

|- - - Meeting - - - |
|:Co. Name :Place Name|
|Profile expires: 15:34|
|OK? 15 sec Cancel?|

Typically, mobile station 300 would notify the user, either audibly or through vibration, to check the station's display 305 for this information. In step 615, the mobile station 300 determines whether user interaction has been received. If a user response has not been received then, in step 620, the mobile station 300 determines whether the timer value for a forced change has expired. If the forced change timer value has expired then, in step 625, a forced change occurs. If in step 620, the timer value for a forced change has not yet expired, control is returned to step 615, where the mobile station again determines whether a user response to the suggested profile/duration has been received. Step 615 and 620 are repeated until either the timer value for a forced change expires or user interaction is received. User interaction may be in the form of the user selecting either "OK" or "Cancel" from display 305 to respectively accept or reject the suggested profile/duration.

In an alternate embodiment, profile changes are never forced even in the absence of user interaction. In yet an alternate embodiment, a "brutal force" mode may be employed in which the user is not provided with the option of rejecting the suggested profile, particularly in cases where the profile is "Switch Off" mode in an airplane, a hospital or the like.

If, in step 615, a user response is received then, in step 630, a determination is made as to whether the user accepted the suggested profile/duration. If the user has not accepted the suggested profile/duration then, in step 635, the mobile station 300 continues operating in its current mode. If, however, the user accepted the suggested profile/duration then, in step 640, the suggested profile change is implemented.

Moreover, in one embodiment, the suggested profile, duration, access point name, etc. may be added to the mobile station's calendar as a new "event". When adding the suggested profile to the calendar as an event, the event heading is preferably formed from the profile name (e.g., meeting) together with the access point name (e.g., company name+ place name). The starting date and time is preferably obtained from the mobile station's clock and the ending time is derived by adding the profile duration to the starting time.

Regardless of whether the profile change was voluntarily accepted or forced upon the user, in step 645, mobile station 300 monitors for the expiration of the suggested duration of the new profile. If the suggested duration has expired then, in step 650, the mobile is returned to its prior state or mode. If the suggest profile duration has not expired, then in step 655, the mobile station 300 determines whether the user has requested a profile change. If the user has requested a mobile change then, in step 660, the profile is changed in accordance with the user's request. If the user has not requested a profile change in step 655 then, steps 645 and 655 are repeated until either the suggested profile change expires or the user requests a profile change.

It will be appreciated that the suggested profile may be a user profile that the access point determines from the user's context (e.g., location, calendar, etc.) and which defines the mobile station's visibility to other devices with which it may come in contact. Thus, profiles including but not limited to "eating", "free time", "outdoors", "shopping", "travelling", etc. are contemplated in addition to the meeting and flight profiles discussed in detail above.

Figure 7A:
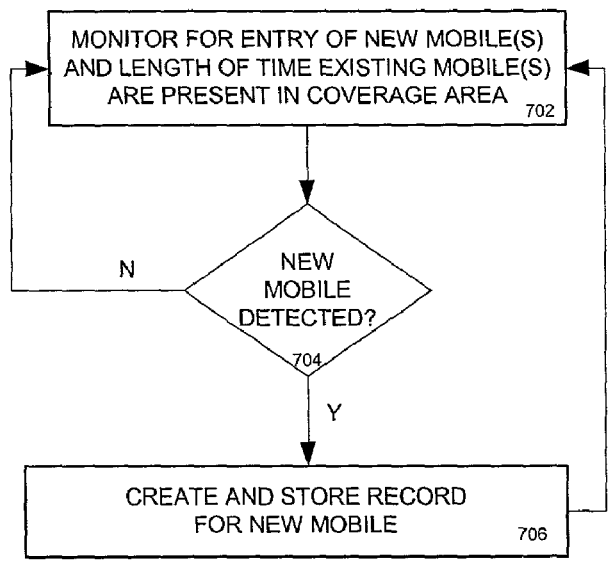
FIG. 7A is a flowchart illustrating an exemplary process by which an access point creates records of mobile stations within its coverage area including the length of time that a mobile station has been in its coverage area.

FIG. 7A is a flowchart illustrating an exemplary process by which an access point creates records of mobile stations within its coverage area including the length of time that a mobile station has been in its coverage area. As shown in step 702, an access point 400 continuously monitors for entry of "new" mobile stations 300 into its coverage area. The access point 400 also monitors the length of time that mobile stations 300 are present in the coverage area. The access point 400 can determine the mobile station's length of time in its coverage area by transmitting frequent inquiries and scanning for inquiry responses or, alternatively, by running frequent pages and scanning for page responses. However, the use of frequent inquiries rather than frequent pages is preferable because it avoids having to establish an active connection between the access point and mobile station.

In step 704, access point 400 determines whether a new mobile station 300 has entered the coverage area. In the event that a new mobile station 300 is detected then, in step 706, access point 400 creates and stores a record for the new mobile station. In one embodiment, the record takes the form of the exemplary record illustrated in FIG. 5B. Once the record has been created and stored, access point 400 returns to step 702 to continue monitoring for new mobile stations and the length of time that existing mobile stations have been in its coverage area.

Figure 7B:
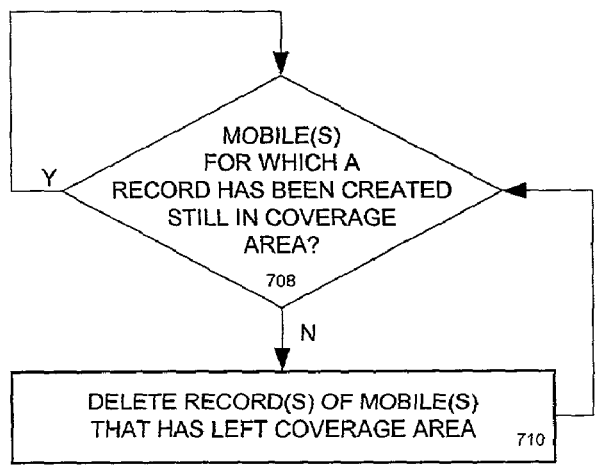
FIG. 7B is a flowchart illustrating an exemplary process by which an access point deletes records created in FIG. 7B.

FIG. 7B is a flowchart illustrating an exemplary process by which an access point deletes records created in FIG. 7B. An access point 400 continuously monitors for mobile stations that have left its coverage area. In step, 708, access point 400 determines whether mobile stations 300 for which records of the type shown in FIG. 5B have been created are still in its coverage area. If any one of the mobile stations 300 has left the coverage area then, in step 710, access point 400 deletes the record corresponding to that mobile station.

Figure 7C:
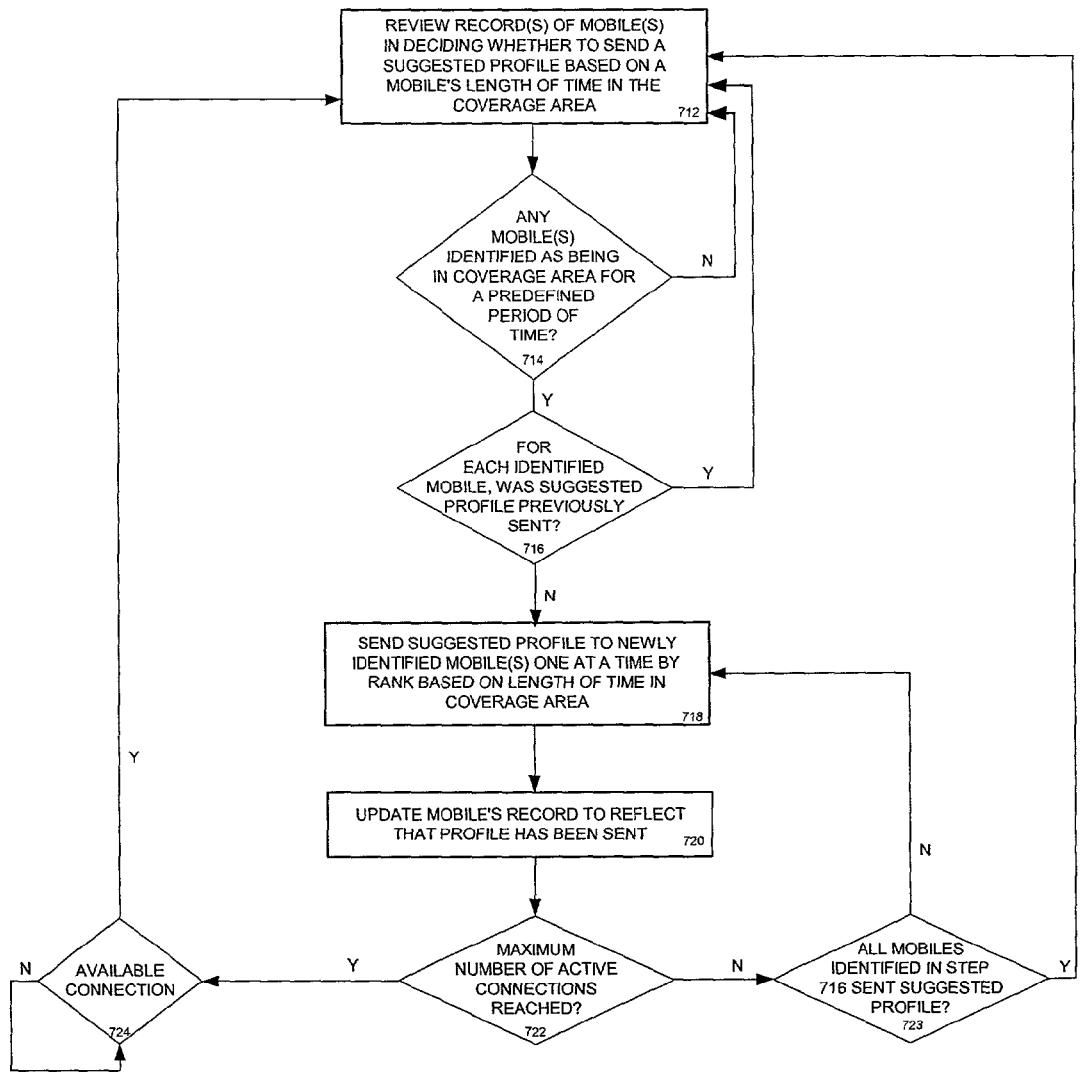
FIG. 7C is a flowchart illustrating an exemplary process by which an access point transmits a suggested profile to mobile stations in accordance with one embodiment of the present invention.

FIG. 7C is a flowchart illustrating an exemplary process by which an access point 400 transmits a suggested profile to mobile stations in accordance with one embodiment of the present invention. As shown in FIG. 7C, in step 712, access point 400 reviews records of mobile stations 300 in its coverage area in deciding whether to send a suggested profile to a particular mobile station based on its length of time within the coverage area.

In step 714, access point 400 determines whether any of the mobile stations 400 have been in its coverage area for a predefined period of time (e.g., 45 seconds). If one or more mobile stations 300 have been in its coverage area for the predefined period of time then, in step 716, access point 400 determines whether a suggested profile was previously sent to each of those mobile stations 300.

If a suggested profile was not previously sent to one or more of those mobile stations then, in step 718, access point 400 ranks the mobile stations that have not yet been sent a suggested profile based on lengths of time within the coverage area (e.g., a mobile station within the coverage area for the longest amount of time will receive the highest rank) and sends a suggested profile to a mobile station having the highest rank.

Access point 400 updates that mobile station's record in step 720 to reflect that a suggested profile has been sent and, in step 722, determines whether a maximum number of active connections has been reached. For example, with a single Bluetooth module, the maximum number of devices that can be actively connected to the access point 400 is presently limited to seven. If the maximum number of active connections has not yet been reached then, in step 723, access point 400 determines whether all of the mobile stations identified in step 716 have been sent a suggested profile.

If not all of the identified mobile stations have been sent a suggested profile, access point 400 repeats steps 718-723 to send a suggested profile to the mobile station of the next highest rank until either all of the identified mobile stations have been sent a suggested profile or a maximum number of active connections has been reached. In either case, access point 400 ultimately continues its review of records associated with mobile stations in its coverage area in deciding whether to send a suggested profile to a particular mobile station based on its length of time within the coverage area. In the case where the maximum number of connections has been reached, however, access point 400 first waits for an available connection before deciding whether to send a suggested profile to mobile stations in its coverage area.

Deciding whether to send a suggested profile to a mobile station based on its length of time within an access point's coverage area provides a mechanism for increasing the likelihood that the suggested profile is sent to an intended recipient (e.g., in FIG. 2, mobile stations belonging to users convened in the conference room 204 rather than those of users walking down the hall 206a on their way elsewhere.). It should be understood, however, that the present invention is not intended to be limited to the transmission of profile changes. For example, the transmitted service may be an advertisement or special offering. Mobile stations that stay awhile in the coverage area are likely to be more interested in the locally available services than mobile stations that are just passing through the coverage area and thus more receptive to receiving the service. Regardless of the service being offered, however, transmitting the service to a mobile station based on its length of time within the coverage area also results in a more efficient usage of an access point's available bandwidth (which, as discussed above, in Bluetooth, is limited to only seven active connections) since the service is sent first to intended recipients and mobile stations exhibiting a greater interest in available local services before sending it, if at all, to others. In short, such limited bandwidth is far too precious to allocate to mobile stations having merely a fleeting association with the access point's coverage area.

Figure 7D:
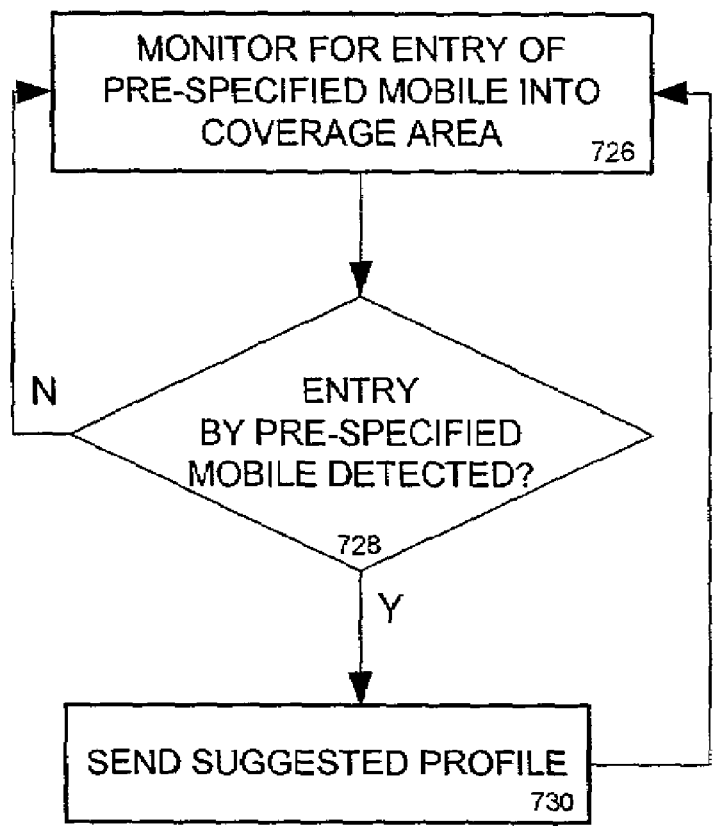
FIG. 7D is a flowchart illustrating an alternate process by which an access point transmits suggested profiles to mobile stations.

FIG. 7D is a flowchart illustrating an alternate process by which an access point transmits suggested profiles to mobile stations. As shown in FIG. 7D, in step 726, access point 400 monitors for entry of a pre-specified mobile station into its coverage area in deciding whether to send a suggested profile to a mobile station. In this manner, an alternative to the mechanism illustrated in FIG. 7C is provided for ensuring that the suggested profile is sent to mobile stations having more than a passing association with the coverage area. In step 728, access point 400 determines whether entry of a pre-specified mobile station has been detected. If a pre-specified mobile station has been detected then, in step 730, access point 400 sends the suggested profile to the mobile station. It will be appreciated that the method of FIG. 7D may also be practiced in combination with the method of FIG. 7C to transmit a suggested profile to pre-specified mobile stations that have remained in the coverage area for a predefined period of time, as discussed above in connection with FIG. 5C.

Figure 8:
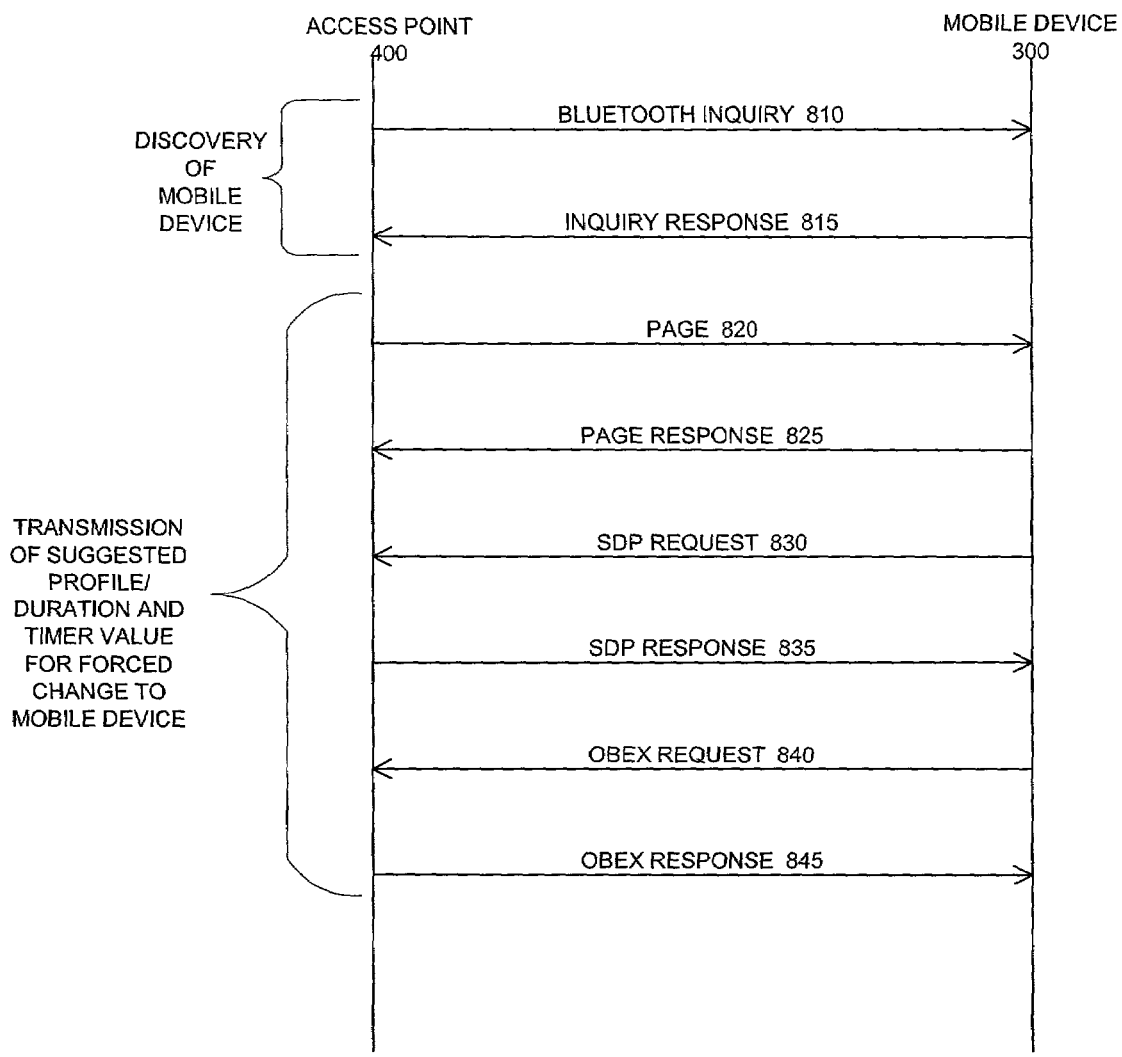
FIG. 8 illustrates an exemplary message flow associated with the transmission of a suggested profile from an access point to a mobile station.

FIG. 8 illustrates an exemplary message flow associated with the transmission of a suggested profile from an access point to a mobile station. Although the exemplary message flow of FIG. 8 is illustrated using typical Bluetooth messages, it will be appreciated that the transmission of a suggested profile may be accomplished using any short range wireless protocol and messages thereof.

As shown in FIG. 8, in one embodiment, access point 400 discovers a mobile device 300 in its coverage area by broadcasting a Bluetooth inquiry 810 and receiving a Bluetooth response 815 from the mobile device 300. The response 815 includes the mobile station's identifier, such as its Bluetooth address.

The access point 400 and mobile station 300 then exchange a series of messages to transmit the suggested profile/duration, the timer value for a forced change, etc., from the access point 400 to the mobile station 300. In particular, the access point transmits a page 820 to the mobile station 300 that sent an inquiry response to it. The page 820 includes the access point's Bluetooth address. Mobile station 300 then transmits a service discovery protocol (SDP) request 830 to the access point 400 to determine the service available from the access point. The access point 400, in turn, transmits an SDP response including its name, the suggested profile change/duration and timer value for a forced change to the mobile station 300 using the format illustrated in FIG. 5A. Moreover, as further shown in FIG. 8, the suggested profile and accompanying information may be transmitted using Object Exchange Protocol (OBEX) messages over Bluetooth or RFID as illustrated by the OBEX request 840 and OBEX Response 845 messages transmitted by the mobile station and access point, respectively.

Figure 9A:
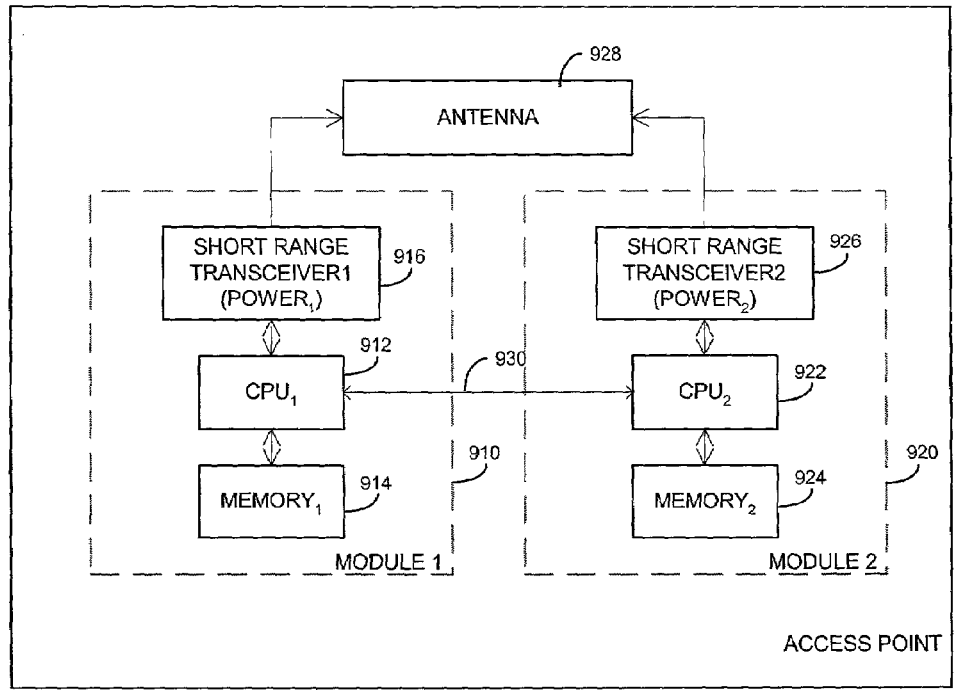
FIG. 9A is a block diagram illustrating an alternate embodiment of an access point including an adjustable power feature for use in accordance with the present invention.

FIG. 9A is a block diagram illustrating an alternate embodiment of an access point including an adjustable power feature for use in accordance with the present invention. As shown in FIG. 9A, access point 400 may include two short range wireless modules (910, 920) or chips, such as two Bluetooth modules. Each module includes a CPU (912, 922) and associated memory (914, 924) for implementing the process of transmitting a suggested profile to a mobile station. The first module (910) includes a low power transceiver 916 for use in detecting new mobile stations. In contrast, the second module 920 includes a high power transceiver 926 for use in transmitting a suggested profile and accompanying information to mobile stations identified by the first module 910. If Bluetooth modules are employed, the current transmission power possibilities for the first and second modules (910, 920) are 1 mW, 2.5 mW, 10 mw and 100 mW. It is to be understood that the terms "low power" and "high power" refer to transceiver 916 operating at a lower power level than transceiver 926, and transceiver 916 thereby having a smaller coverage area than transceiver 926.

Figure 10:
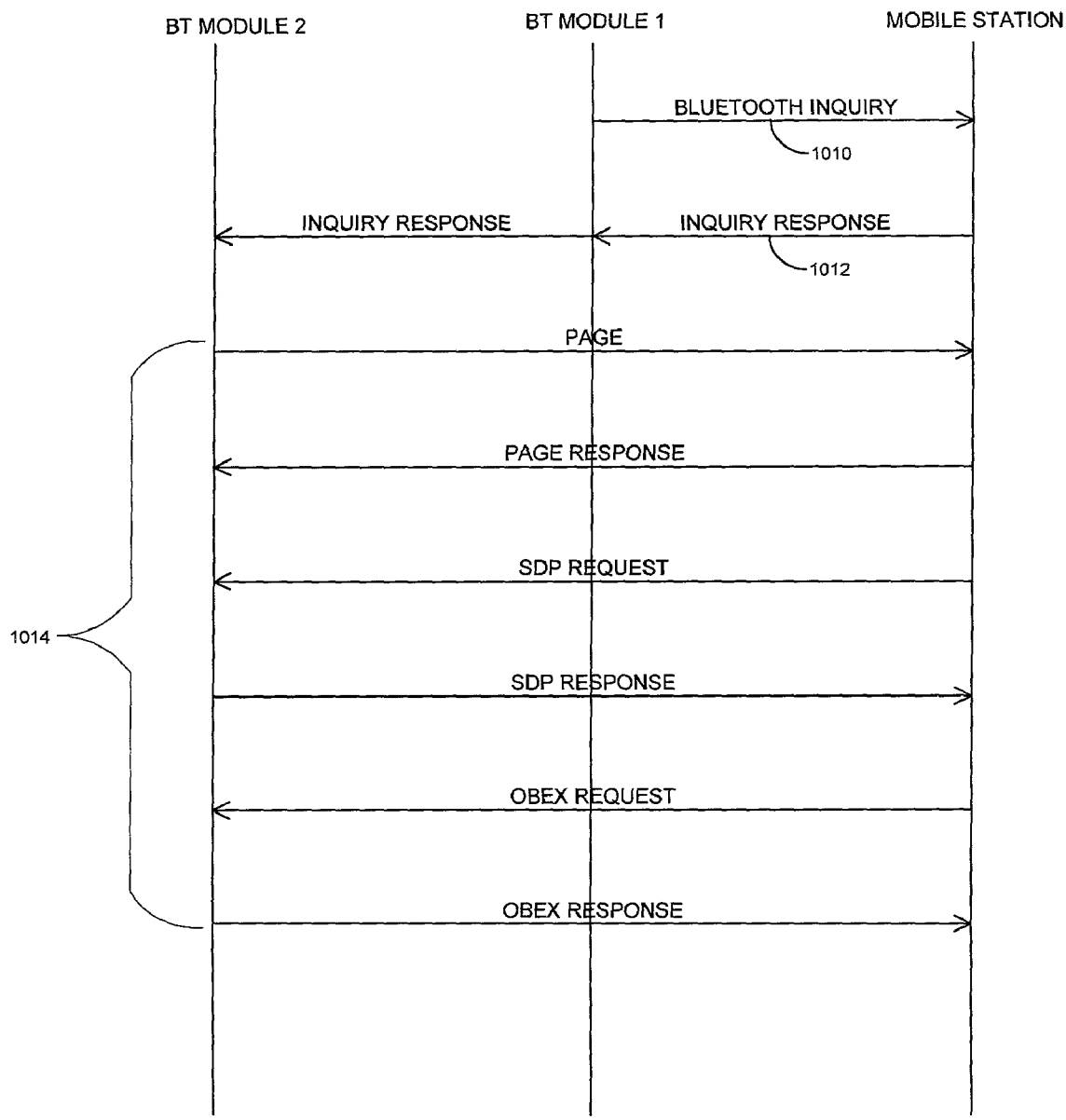
FIG. 10 illustrates an exemplary message flow for transmitting a suggested profile to a mobile station in accordance with the embodiment of the access point shown in FIG. 9A.

More particularly, as shown in FIG. 10, the first module 910 of the access point of FIG. 9A broadcasts a Bluetooth inquiry 1010 over antenna 928 using its low power transceiver 916. A mobile station within the access point's coverage area, having received the inquiry 1010, then transmits an inquiry response 1012 (including its Bluetooth address) to the first module 910, which relays the response to the access point's second module 920 via coupling 930 or a wireless connection. As indicated by reference numeral 1014, the second module 920 then establishes a connection with the mobile station and transmits the suggested profile and accompanying information to the mobile station over the antenna 928 using its high power transceiver 926, in the manner discussed above in connection with FIG. 8 (messages 820-845). This software-based power tuning presents yet another mechanism for ensuring that the suggested profile is sent to mobile stations having more than a passing association with the coverage area because only those mobile stations in close proximity to the access point will reply to the inquiry broadcast at low power.

Figure 9B:
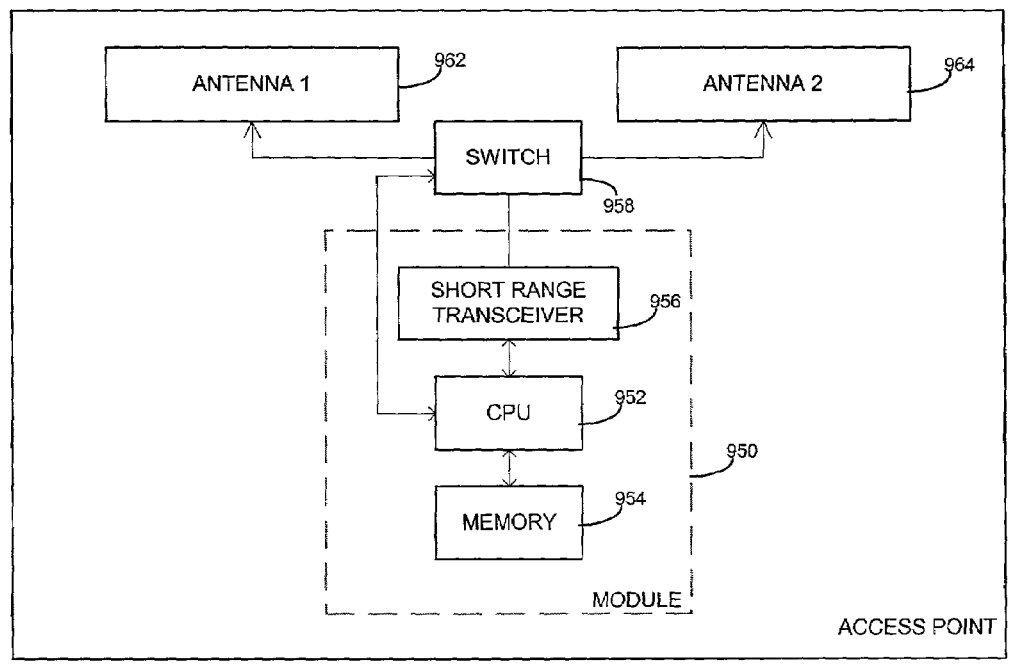
FIG. 9B is a block diagram illustrating another embodiment of an access point including an adjustable power feature.

FIG. 9B is a block diagram illustrating an alternate embodiment of an access point including an adjustable power feature. As shown in FIG. 9B, rather than including two short range wireless modules, an access point may include a single module 950 that switches between two antennas (962, 964) of different transmission characteristics as will be discussed hereinafter. In this embodiment, the access point includes a CPU 952 and associated memory 954 for implementing the process of transmitting a suggested profile to a mobile station. The CPU 952 is coupled to both a short range transceiver 956 and a switch 958. The switch 958, in turn, is coupled to two antennas—namely, first antenna 962 and second antenna 964. First antenna 962 is designed such that it has different transmission characteristics than second antenna 964 such that its transmission coverage area is minimized vis-a-vis the transmission coverage area of the second antenna. As is well-known in the art, factors including but not limited to the shape, placement, direction, length and electrical properties (e.g., material/inductance) of the antenna affects its efficiency and thus its coverage area. During operation, CPU 952 causes switch 958 to switch to the first antenna 962 having a lesser coverage area than second antenna 964 when detecting new mobile stations. In this manner, the access point can ensure that the suggested profile is sent to mobile stations having more than a passing association with the coverage area. In contrast, CPU 952 causes switch 958 to switch to the second antenna 964 having a greater coverage area than first antenna 962 when transmitting a suggested profile and accompanying information to mobile stations identified by the access point via the first antenna 962. The message flows that occur between the access point of FIG. 9B and mobile stations would be the same as those shown in FIG. 10, wherein the BT Module 1 and BT Module 2 would be replaced by first antenna and second antenna, respectively.

Figure 9C:
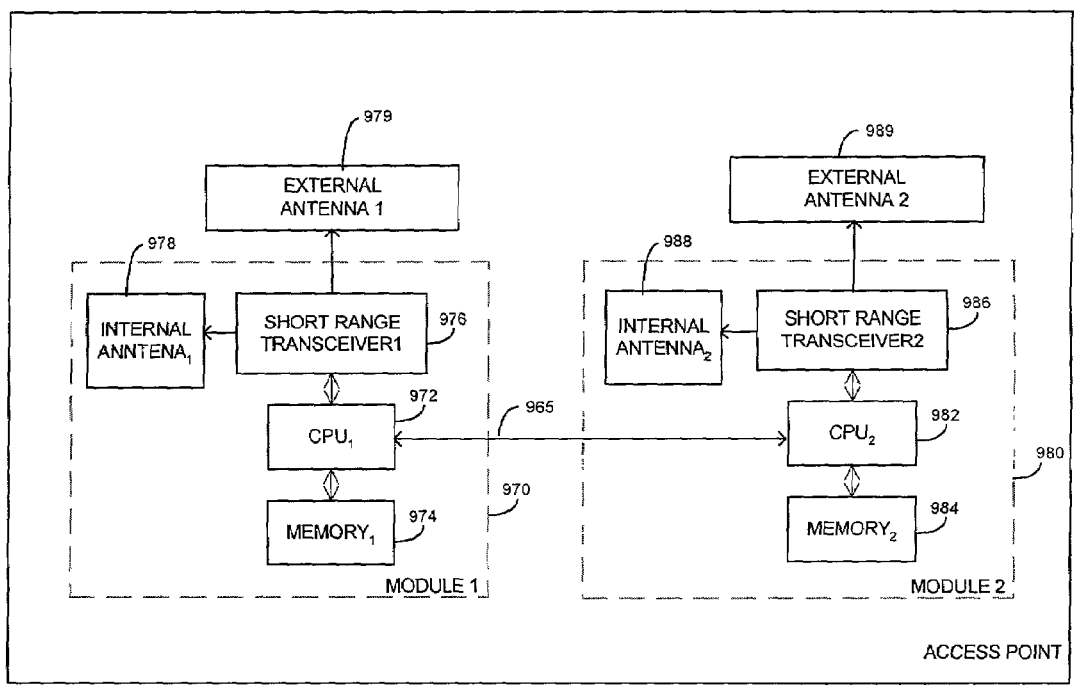
FIG. 9C is a block diagram illustrating yet another embodiment of an access point including an adjustable power feature.

FIG. 9C is a block diagram illustrating yet another embodiment of an access point including an adjustable power feature. As shown in FIG. 9C, access point 400 may include two short range wireless modules (970, 980), such as two Bluetooth modules, much like the access point shown in FIG. 9A. Each module includes a CPU (972, 982) and associated memory (974, 984) for implementing the process of transmitting a suggested profile to a mobile station. Both modules (970, 980) include a short range transceiver (976, 986). However, unlike the embodiment of FIG. 9A, the short range transceivers (976, 986) in the present embodiment transmit at the same power level.

Each module also contains a chip-based internal antenna (978, 988). As shown in FIG. 9C, the modules (970, 980) are each coupled to separate circuit board-based external antennas (979, 989). The transmission characteristics of the internal antennas (978, 988) versus the external antennas (979, 989) are such that the internal antennas (978, 988) have a smaller coverage area than the external antennas (979, 989). In the embodiment of FIG. 9C, module 970 uses internal antenna 978 to identify new mobile stations (e.g., by transmitting inquiries and receiving inquiry responses), whereas module 980 uses external antenna 989 to transmit a suggested profile and accompanying information to mobile stations identified by module 970. The message flows that occur between the modules (970, 980) themselves and the modules and the mobile stations during mobile station identification and suggested profile transmission are the same as those shown in FIG. 10.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims. For example, in addition to the adjustable power features discussed above in connection with FIGS. 9A-9C, it will be appreciated that an adjustable power feature may also be implemented by having two modules each coupled to its own antenna, wherein the two antennas have the same transmission characteristics but the two modules transmit at different power levels. Alternatively, the difference in coverage areas may be accomplished by using two modules having both different power levels and different transmission characteristics (i.e., by not keeping one or the other of these parameters the same).

We claim:

1. A method, comprising:
    determining a length of time that each of a plurality of mobile stations has been in an access point coverage area;
    identifying mobile stations that have been in the coverage area for a predefined period of time; and
    transmitting data relating to a service to the identified mobile stations based on the length of time that each mobile station has been in the coverage area,
    wherein the data relating to the service is transmitted first to mobile stations that have been in the coverage area longer.

2. The method of claim 1 wherein the service is a profile change.

3. The method of claim 2 wherein whether the mobile station has been in the coverage area for the predefined period of time includes determining whether the length of time that the mobile station has been in the access point coverage area equals the predefined period of time.

4. The method of claim 1 wherein the data includes a profile.

5. The method of claim 4 wherein the data further includes a profile duration.

6. The method of claim 4 wherein the data further includes a timer value for a forced change in an absence of user interaction.

7. The method of claim 4 wherein the data includes a name of the access point.

8. The method of claim 3 wherein the profile restricts a mode of operation of the mobile station and the data further includes a timer value for a forced change to the restrictive profile upon expiration of the timer value in an absence of user interaction.

9. The method of claim 1 wherein the service is transmitted to the mobile stations via a short range wireless connection.

10. The method of claim 9 wherein the wireless connection is Bluetooth.

11. The method of claim 1 wherein the data relating to the service is transmitted to each one of the mobile stations until a maximum number of active connections available at an access point has been reached.

12. The method of claim 1 wherein identifying mobile stations that have been in the coverage area for a predefined period of time comprises:
    identifying mobile stations that are eligible to receive the service upon being in the coverage area for the predefined period of time.

13. The method of claim 12, wherein identifying mobile stations that are eligible includes selecting mobile stations from a list of eligible mobile stations.

14. The method of claim 12 wherein mobile station eligibility is based on a mobile station being a member of a class of devices.

15. The method of claim 14 wherein the class of devices is a mobile phone class.

16. The method of claim 12 wherein mobile station eligibility is based on a characteristic of a user of a mobile station.

17. The method of claim 1 wherein determining a length of time comprises,
    an access point sending inquiries to detect the presence of the mobile station without establishing an active communication connection with the mobile station;
    receiving inquiry responses from the mobile station; and
    after detecting, from a plurality of the inquiry responses, that the mobile station has remained within the coverage area for the predefined period of time, the access point initiating an active communication connection with the mobile station to provide the data relating to the service.

18. The method of claim 1, further comprising only establishing an active communication connection to a mobile station upon determining that the mobile station has been in the coverage area for the predefined period of time.

19. An apparatus, comprising:
    a processor configured to:
        determine a length of time that each of a plurality of mobile stations has been in an access point coverage area;
        identify mobile stations that have been in the coverage area for a predetermined period of time; and
        transmit data relating to a service to the identified mobile stations based on the length of time that each mobile station has been in the coverage area,
        wherein the data relating to the service is transmitted first to mobile stations that have been in the coverage area longer.

20. The apparatus of claim 19 wherein identifying mobile stations that have been in the coverage area for a predetermined period of time comprises:
    identifying mobile stations that are eligible to receive the service upon being in the coverage area for the predetermined period of time.

21. The apparatus of claim 20, wherein identifying mobile stations that are eligible includes selecting mobile stations from a list of eligible mobile stations.

22. The apparatus of claim 20 wherein mobile station eligibility is based on a mobile station being a member of a class of devices.

23. The apparatus of claim 22 wherein the class of devices is a mobile phone class.

24. The apparatus of claim 20 wherein mobile station eligibility is based on a characteristic of a user of a mobile station.

25. The apparatus of claim 19 wherein to determine a length of time that a mobile station has been in an access point coverage area comprises the processor being further configured to:

send inquiries to detect the presence of the mobile station without establishing an active communication connection with the mobile station;

receive inquiry responses from the mobile station; and after detecting, from a plurality of the inquiry responses, that the mobile station has remained within the coverage area for the predefined period of time, initiate an active communication connection with the mobile station to provide the data relating to the service.

26. The apparatus of claim 19 wherein the service is a profile change.

27. The apparatus of claim 19 wherein the data includes a profile.

28. The apparatus of claim 27 wherein the data further includes a profile duration.

29. The apparatus of claim 19 wherein the data includes information about locally available services.

30. The apparatus of claim 29 wherein the information comprises an advertisement.

31. The apparatus of claim 19 further comprising a memory.

32. The apparatus of claim 31, wherein said memory includes program code that when executed causes the processor to perform said determining, identifying and transmitting.

33. A method, comprising:

determining a length of time that each of a plurality of mobile stations has been in an access point coverage area;

identifying mobile stations that have been in the coverage area for a predefined period of time; and transmitting data relating to a profile change to the identified mobile stations based on the length of time that each mobile station has been in the coverage area, wherein the data relating to the profile change is transmitted first to mobile stations that have been in the coverage area longer.

34. An apparatus, comprising:

means for determining a length of time that each of a plurality of mobile stations has been in an access point coverage area;

means for identifying mobile stations that have been in the coverage area for a predetermined period of time; and means for transmitting data relating to a service to the identified mobile stations based on the length of time that each mobile station has been in the coverage area, wherein the data relating the service is transmitted first to mobile stations that have been in the coverage area longer.

35. The apparatus of claim 34, wherein said data relating to a service includes information about locally available services.

\* \* \* \* \*